(12) United States Patent
Martin et al.

(10) Patent No.: US 10,650,705 B2
(45) Date of Patent: May 12, 2020

(54) JOINTED LEG SYSTEM FOR TAXIDERMY

(71) Applicant: McKenzie Sports Products, LLC, Granite Quarry, NC (US)

(72) Inventors: Roger Aaron Martin, Ablemarle, NC (US); Brian E. Hendricks, Scottville, MI (US)

(73) Assignee: McKenzie Sports Products, LLC, Granite Quarry, NC (US)

( * ) Notice: Subject to any disclaimer, the term of this patent is extended or adjusted under 35 U.S.C. 154(b) by 529 days.

(21) Appl. No.: 14/019,001

(22) Filed: Sep. 5, 2013

(65) Prior Publication Data

US 2014/0072943 A1 Mar. 13, 2014

Related U.S. Application Data

(60) Provisional application No. 61/699,529, filed on Sep. 11, 2012.

(51) Int. Cl.
*G09B 23/36* (2006.01)
*G09B 23/32* (2006.01)

(52) U.S. Cl.
CPC ............. *G09B 23/36* (2013.01); *G09B 23/32* (2013.01)

(58) Field of Classification Search
CPC ......... G09B 23/00; G09B 23/32; G09B 23/36
USPC .................................................. 434/295, 296
See application file for complete search history.

(56) References Cited

U.S. PATENT DOCUMENTS

| 706,775 | A | | 8/1902 | Peano | |
|---|---|---|---|---|---|
| 3,200,515 | A | * | 8/1965 | Daigre | 434/296 |
| 4,781,597 | A | * | 11/1988 | Cowley | 434/296 |
| 6,623,814 | B2 | | 9/2003 | Harness | |
| 8,210,852 | B2 | | 7/2012 | Miller et al. | |
| 8,308,488 | B2 | | 11/2012 | Eppley | |
| 2008/0194176 | A1 | * | 8/2008 | Pennington | A63H 3/04 446/375 |
| 2010/0119296 | A1 | * | 5/2010 | Lara | B44B 1/06 403/24 |
| 2011/0091858 | A1 | | 4/2011 | Eppley | |
| 2011/0232153 | A1 | | 9/2011 | Jennings, Jr. et al. | |

OTHER PUBLICATIONS

"Building Armatures for Clay Animation," Josh Mosley, http://web.archive.org/web/20080906120324/http://joshuamosley.com/tutorials/claymationArmature/armature.html, Sep. 6, 2008.*

(Continued)

*Primary Examiner* — Sean K. Hunter
*Assistant Examiner* — Jennifer L Korb
(74) *Attorney, Agent, or Firm* — Panitch Schwarze Belisario & Nadel LLP

(57) ABSTRACT

A leg for attachment to a main body of a taxidermy mannequin includes first, second, and third portions, each having first and second ends. The first end of the first portion includes a connector for coupling to the main body. The first end of the second portion is connected to the second end of the first portion to form a first joint. At least one of the first or second portions has a first cut-away section proximate the first joint with a reduced thickness. The first end of the third portion is connected to the second end of the second portion to form a second joint. At least one of the second or third portions has a second cut-away section proximate the second joint with a reduced thickness.

8 Claims, 5 Drawing Sheets

(56) References Cited

OTHER PUBLICATIONS

"Sculpture Tutorial: Building an Armature," paint-sculpt.com, http://web.archive.org/web/20071107142927/http://www.paint-sculpt.com/tutorials/sculpting-tutorial/building-an-armature.html, Nov. 7, 2007.*
"Think Like a Horse—Natural Horsemanship," Rick Gore Horsemanship, https://web.archive.org/web/20100806135002/http://www.thinklikeahorse.org/index-5.html, Aug. 6, 2010.*

* cited by examiner

JOINTED LEG SYSTEM FOR TAXIDERMY

CROSS-REFERENCE TO RELATED APPLICATIONS

This application claims priority to U.S. Provisional Patent Application No. 61/699,529, filed on Sep. 11, 2012, entitled "Jointed Leg System for Taxidermy," the entire contents of which are incorporated by reference herein.

BACKGROUND OF THE INVENTION

An embodiment of the present invention relates generally to the art of taxidermy, and more particularly, to a jointed leg system for taxidermy.

Currently, most animal skins are mounted over a rigid foam animal form (sometimes referred to as a "mannequin" or "mannequin form"). With the rigid foam mannequin, the arms and legs are molded in a fixed position (molded next to the body as seen in, for example, FIG. 1) to keep the skin tight or provide a better fit. In some cases a flexible foam mannequin is used but the same problem of dealing with the excess skin exists. When preparing the mannequin for use the taxidermist must cut a "slot" at the intersection of each joint to allow the skin to slide in place properly at the joint as it would occur in a natural fold. In a case where the leg or arm is folded against the body, the same type of "slot" must be cut to allow the excess skin to be properly tucked.

This problem is best described by imagining that a person's arm is attached to the abdomen, e.g., "Napoleon style." With the arm glued to the abdomen, if the person were instructed to put on a jacket, there would need to be a separation, or "slot," created between the arm and the abdomen for the jacket to slide between. This is the issue with mounting an animal skin over a mannequin with the appendages in a fixed position.

It would be desirable to provide a mannequin that does not require "slots" for fitting of the skin and allows anatomically correct bending of the appendages, at least during the taxidermy process.

BRIEF SUMMARY OF THE INVENTION

Briefly stated, an embodiment of the present invention comprises a leg for attachment to a main body of a taxidermy mannequin. The leg includes a first portion having first and second ends. The first end includes a connector for coupling the first portion to the main body of the mannequin. A second portion has first and second ends. The first end of the second portion is connected to the second end of the first portion to form a first joint about which the first portion is movable with respect to the second portion. At least one of the first portion or the second portion has a first cut-away section proximate the first joint. The first cut-away section has a reduced thickness as compared to a thickness of a remainder of the respective first or second portion. A third portion has first and second ends. The first end of the third portion is connected to the second end of the second portion to form a second joint about which the second portion is movable with respect to the third portion. At least one of the second portion or the third portion has a second cut-away section proximate the second joint. The second cut-away section has a reduced thickness as compared to a thickness of a remainder of the respective second or third portion.

BRIEF DESCRIPTION OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

DETAILED DESCRIPTION OF THE INVENTION

Figure 1:
FIG. 1 is a side elevational view of conventional foam taxidermy mannequin.
Figure 2:
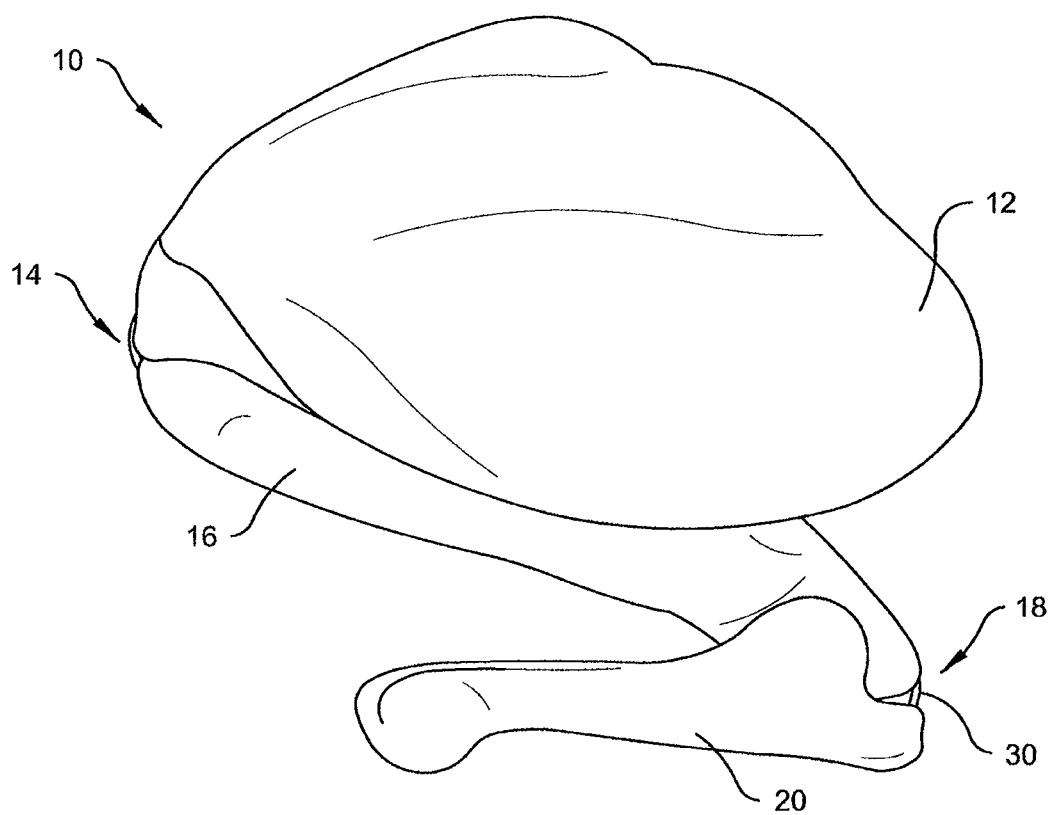
FIG. 2 is a front side elevational view of a rear left leg for a taxidermy mannequin assembled in accordance with a preferred embodiment of the present invention.
Figure 3:
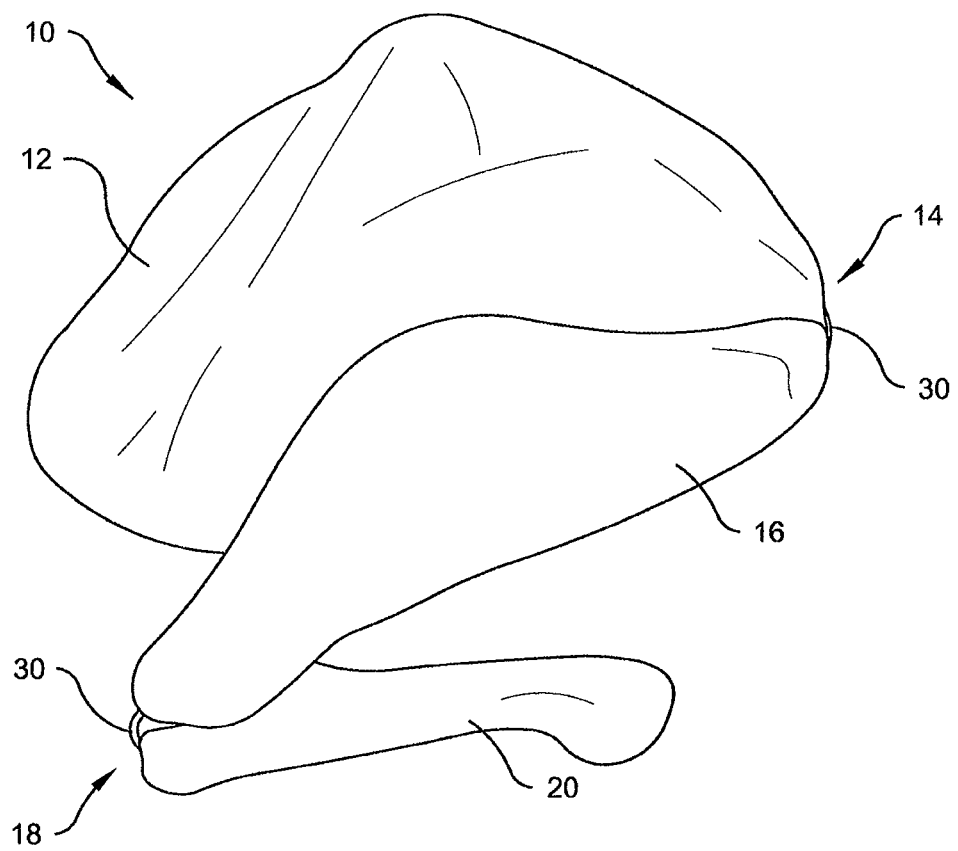
FIG. 3 is a rear side elevational view of the leg of FIG. 2.
Figure 4:
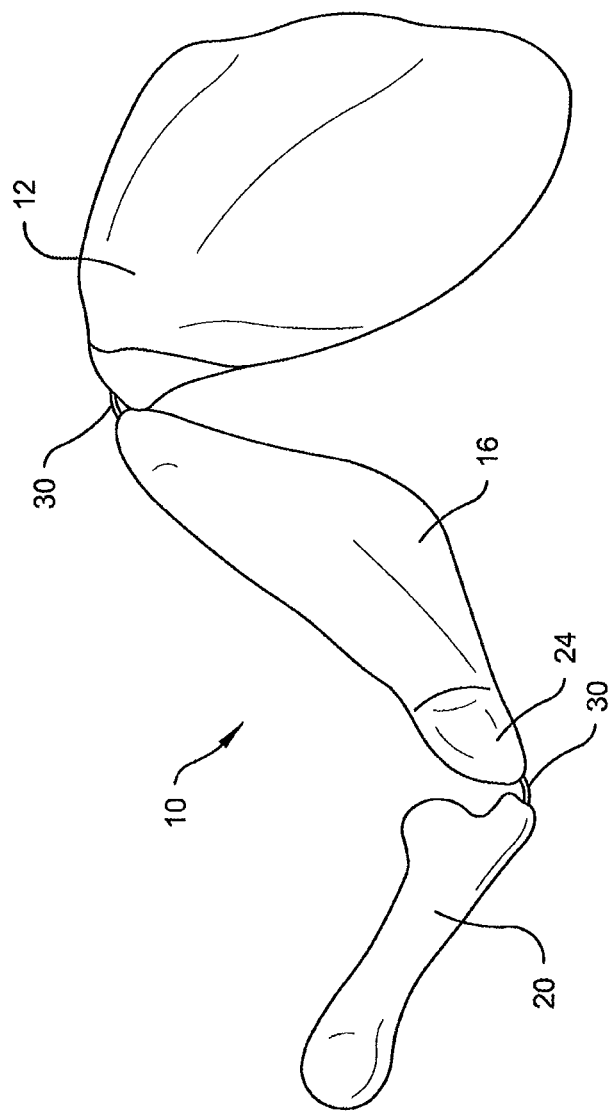
FIG. 4 is an front side elevational exploded view of the leg of FIG. 2.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

Referring to the drawings in detail, wherein the same reference numerals indicate like elements throughout, there is shown in FIGS. 2-5 a preferred embodiment of a taxidermy leg 10, which in the following example is a left hind leg of an animal (not shown). The leg 10 includes a thigh portion 12, a knee joint 14, a lower leg portion 16, an ankle joint 18, and a foot portion 20. The thigh portion 12, lower leg portion 16, and foot portion 20 are preferably all molded using a low density urethane foam, which is a commonly used material in the taxidermy field. However, other materials could be used if desired. The thigh portion 12, lower leg portion 16, and foot portion 20 are also preferably shaped, at least in outward facing regions, to mimic the contour of bone and/or tissue in the corresponding anatomy of the subject animal. In this manner, when the hide (not shown) is placed over the leg 10, the leg 10 retains a realistic and anatomically correct appearance.

Figure 5:
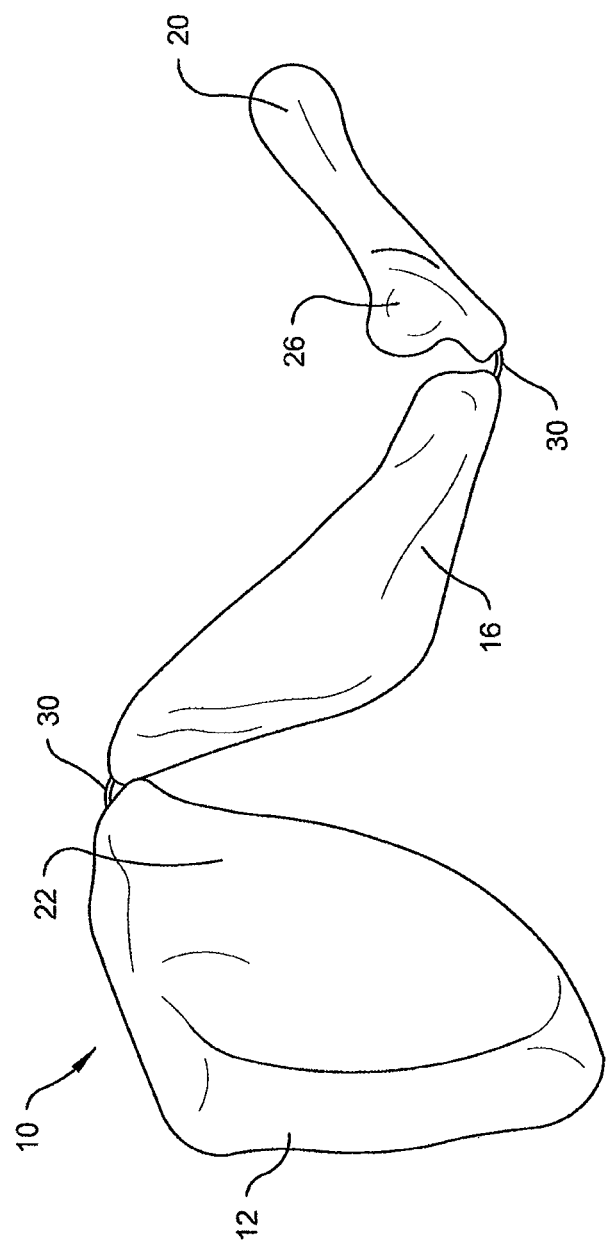
FIG. 5 is a rear side elevational exploded view of the leg of FIG. 2.

The thigh portion 12, lower leg portion 16, and foot portion 20 also each preferably include cut-away sections, particularly in the areas of the knee and ankle joints 14, 18, to allow for proper mating and overlap of the different pieces of the leg 10. For example, as can be seen in FIG. 5, the thigh portion 12 includes a first cut-away section 22, which has a reduced thickness as compared to the remainder of the thigh portion 12. The first cut-away section 22 allows the lower leg portion 16 to be placed behind the thigh portion 12 when the leg 10 is posed to the desired position (see e.g., FIGS. 2 and 3). Similarly, the lower leg portion 16 includes a second cut-away section 24 (FIG. 4) in the area of the ankle joint 18, which mates with a third cut-away section 26 (FIG. 5) of the foot portion 20. In the final position (FIGS. 2, 3), the foot portion 20 overlaps the lower leg portion 16 in the area of the ankle joint 18 for a more realistic appearance. The second and third cut-away sections 24, 26 are also designed to, when mated, limit articulation of the lower leg and foot portions 16, 20 with respect to one another.

The size, shape, and location of the cut-away sections 22, 24, 26 is not limited to the embodiment shown, and may be designed to optimize mating of the thigh, lower leg, and foot portions 12, 16, 20 in light of the desired position of the leg 10.

The leg 10 also preferably includes a wire 30 or other such attachment device that preferably extends through the interior of each of the thigh, lower leg, and foot portions 12, 16, 20 and loosely joins the three portions to form the leg 10. The wire 30 is preferably made of steel, although other materials may be used which provide a rigid form that is capable of bending. Preferably, a single wire 30 is molded into the thigh, lower leg, and foot portions 12, 16, 20 and is exposed at the knee and ankle joints 14, 18 to permit the necessary positioning of the components of the leg 10 with respect to one another. However, other methods for joining the components of the leg 10 may be used.

For example, one wire 30 may be used to connect the thigh and lower leg portions 12, 16 while a second wire 30 may be used to connect the lower leg and foot portions 16, 20. Similarly, the wire 30 need not be embedded in the urethane foam material, and instead may be fastened or adhered to external surfaces of, or channels formed in, the thigh, lower leg, and foot portions 12, 16, 20 which are obscured from view in the final position of the leg 10.

In preferred embodiments, the leg 10 is attached to an appropriate location on the main body of the mannequin (not shown) by an adhesive or some other fastener. It is also contemplated that an end of the wire 30 may be exposed (not shown) from the thigh portion 12 for connecting the leg 10 to the main body of the mannequin. For example, the end of the wire 30 may be inserted into the mannequin at a connection point (e.g., proximate the "hip" (not shown)) and twisted. In other embodiments, the end of the wire 30 may include a loop (not shown) that attaches to a hook (not shown) on the main body of the mannequin. Similarly, it is preferred that another end of the wire 30 may be exposed from the foot portion 20 for connecting the foot portion 20 to a base (not shown) of the mannequin at a point of contact. Other methods of attachment, such as fasteners, or the like, may of course be used as well. Similarly, the connection points at the mannequin and/or the base may differ and are dictated by the desired position of the leg 10.

Once the leg 10 is connected to the mannequin, the taxidermist may apply the hide of the animal. Using conventional hide paste or glue, the hide is adhered to the mannequin and leg 10. As the hide dries, the leg 10 is held in place in the desired position. With the leg 10 according to embodiments of the present invention, it is much simpler to apply the hide to portions of the leg 10 that are curled, tucked, or overlapping with one another and/or the main body of the mannequin. However, the leg 10 may also be utilized for taxidermy mannequins for standing animals where the undesirable "slots" described above are not present.

While the leg 10 has been described as having the thigh, lower leg, and foot portions 12, 16, 20, it is contemplated that only certain of these components may be necessary in completing the mannequin. For example, depending on the position of the mannequin, only the lower leg and foot portions 16, 20, along with the ankle joint 18 may be necessary. Thus, it may be that a single joint (e.g., the knee or ankle joint 14, 18) is all that is required to achieve the desired effect. In some embodiments, no foot portion 20 may be included.

Embodiments of the invention would also be applicable to a front leg (not shown) for attachment to the mannequin. For example, the molded urethane portions would encompass the shoulder portion, arm portion, forearm portion, and foot portion. The shoulder and arm portions would be joined at a shoulder joint by the wire, the arm and forearm portions would be joined at an elbow joint by the wire, and the forearm and foot portions would be joined at a wrist joint by the wire. Cut-away sections in the shoulder, arm, forearm, and foot portions may be formed as necessary to achieve an anatomically correct pose for the front leg. The front leg would preferably be attached to the mannequin by an adhesive or some other fastener. Alternatively, the front leg may be attached to the mannequin by the wire at a connection point proximate the shoulder portion. However, the desired position of the front leg may dictate alternate connection points for the front leg. The foot may similarly be connected to the base using an end of the wire, although the connection may also be made using adhesives, fasteners, or the like. In addition, as described above with respect to the rear leg 10, the front leg may not necessarily require all of the above-listed portions depending on the position of the mannequin. For example, only the foot and forearm portions, combined by a wrist joint, may be necessary. Thus, it may be that the mannequin requires only one or two of the previously described joints for the front leg. It is also contemplated that in some embodiments a "wing" may be simulated.

From the foregoing, it can be seen that embodiments of the present invention comprise a jointed leg system for taxidermy. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

We claim:

1. An artificial leg for attachment to a main body of a taxidermy mannequin in an anatomically correct fixed position that is maintained in place by application of a hide to the artificial leg, the artificial leg comprising: a first portion having first and second ends and outer and inner facing surfaces, the outer facing surface of the first portion being contoured to mimic a contour of bone and/or tissue in an animal, the first end of the first portion including a connector for coupling the first portion to the main body of the mannequin; a second portion having first and second ends and outer and inner facing surfaces, the outer facing surface of the second portion being contoured to mimic a contour of bone and/or tissue in the animal, the first end of the second portion being connected to the second end of the first portion to form a first joint about which the first portion is movable with respect to the second portion, the inner facing surface of the first portion having a first cut-away section proximate the first joint, the first cut-away section having a reduced thickness as compared to a thickness of a remainder of the first portion, the first and second portions being mated with one another at the first cut-away section with the second portion being placed behind the first portion such that the first cut-away section of the inner facing surface of the first portion contacts the outer facing surface of the second portion and the entire outer facing surface of the first portion remains exposed when the artificial leg is placed in the anatomically correct fixed position; a third portion having first and second ends and outer and inner facing surfaces, the outer facing surface of the third portion being contoured to mimic a contour of bone and/or tissue in the animal, the first end of the third portion being connected to the second end of the second portion to form a second joint about which the second portion is movable with respect to the third portion, the outer facing surface of the second portion having a second cut-away section proximate the second joint, the second cut-away section having a reduced thickness as compared to a thickness of a remainder of the second portion, the inner facing surface of the third portion having a third cut-away section proximate the second joint, the third cut-away section having a reduced thickness as compared to a thickness of a remainder of the third portion, the second and third portions being mated with one another at the second and third cut-away sections such that the second cut-away section of the outer facing surface of the second portion contacts the third cut-away section of the inner facing surface of the third portion and the entire outer facing surface of the third portion remains exposed when the artificial leg is placed in the anatomically correct fixed position, wherein the mating of the second and third cut-away sections limits articulation of the second and third portions with respect to one another; and at least one wire used to connect the first, second, and third portions together, wherein, in the anatomically correct fixed position, the outer facing surfaces of the first, second, and third portions all face a first direction, while the inner facing surfaces of the first, second, and third portions all face a second direction opposite to the first direction.

2. The artificial leg of claim 1, wherein the at least one wire is molded into the first, second, and third portions.

3. The artificial leg of claim 2, wherein a portion of the at least one wire is exposed at the second end of the third portion for connecting the artificial leg to a base of the mannequin.

4. The artificial leg of claim 2, wherein a portion of the at least one wire is exposed at the first end of the first portion and forms the connector.

5. The artificial leg of claim 1, wherein the at least one wire is made of steel.

6. The artificial leg of claim 1, wherein the connector is at least a portion of a wire.

7. The artificial leg of claim 1, wherein at least one of the first, second, or third portions is made from urethane foam.

8. The artificial leg of claim 1, wherein the first portion is a thigh portion, the first joint is a knee joint, the second portion is a lower leg portion, the second joint is an ankle joint, and the third portion is a foot portion.

* * * * *